United States Patent
Ivashchenko et al.

(10) Patent No.: US 10,425,332 B2
(45) Date of Patent: Sep. 24, 2019

(54) METHOD FOR PROCESSING PACKETS USING ALG DNS

(71) Applicant: NFWARE, INC., Wilmington, DE (US)

(72) Inventors: Pavel Ivashchenko, Smolensk (RU); Igor Pavlov, Moscow (RU)

(73) Assignee: NFWARE, INC., Wilmington, DE (US)

( * ) Notice: Subject to any disclaimer, the term of this patent is extended or adjusted under 35 U.S.C. 154(b) by 75 days.

(21) Appl. No.: 15/858,474

(22) Filed: Dec. 29, 2017

(65) Prior Publication Data
US 2019/0207850 A1    Jul. 4, 2019

(51) Int. Cl.
*H04L 29/06*    (2006.01)
*H04L 12/741*   (2013.01)
*H04L 29/08*    (2006.01)

(52) U.S. Cl.
CPC .......... *H04L 45/74* (2013.01); *H04L 69/16* (2013.01); *H04L 69/22* (2013.01); *H04L 69/329* (2013.01)

(58) Field of Classification Search
CPC ....... H04L 45/74; H04L 69/16; H04L 69/329; H04L 69/22
See application file for complete search history.

(56) References Cited

U.S. PATENT DOCUMENTS

| | | | |
|---|---|---|---|
| 2006/0098663 A1* | 5/2006 | Shore | H04L 29/12009 370/401 |
| 2007/0168551 A1* | 7/2007 | Eisink | H04L 29/12009 709/245 |
| 2010/0031339 A1* | 2/2010 | Minnen | H04L 29/12009 726/12 |
| 2016/0255012 A1* | 9/2016 | Mizrachi | H04L 63/00 370/230 |
| 2016/0323299 A1* | 11/2016 | Huston, III | H04L 63/1416 |
| 2019/0068625 A1* | 2/2019 | Alfano | H04L 63/1425 |

OTHER PUBLICATIONS

DNS ALG Overview: https://www.juniper.net/documentation/en_US/junos12.1x44/topics/concept/security-alg-dns-overview.html.

* cited by examiner

*Primary Examiner* — Walli Z Butt
(74) *Attorney, Agent, or Firm* — BCF LLP (57) ABSTRACT

A method of processing data packets, the method executable by a router. The method comprises receiving an indication of a UDP port number associated with a port used by a DNS server and a session duration for the port; receiving a UDP packet; in response to a destination port of the UDP packet matching the DNS port number, sending by a NAT component of the router, the UDP packet to an ALG DNS handler of the router. The method further comprises analyzing, by the ALG DNS handler, a payload length of the at least one UDP packet and verifying whether the UDP packet meets a processing condition. The method further comprises determining a DNS packet type.

9 Claims, 8 Drawing Sheets

| Bits | 0 - 15 | 16 - 31 |
|---|---|---|
| 0-31 | Source port | Destination port |
| 32-63 | Datagram length | Checksum |
| 64-... | Data | |

FIG. 1

| Bits   | 0 - 15                           | 16 - 31                         |
|--------|----------------------------------|---------------------------------|
| 0-31   | Identification                   | Flags                           |
| 32-63  | Queries, qty                     | Answer resource entries, qty    |
| 64-95  | Access rights resource entries, qty | Additional resource entries, qty |
| 95-... | Questions                        |                                 |
|        | Answers                          |                                 |
|        | Access rights                    |                                 |
|        | Additional info                  |                                 |

FIG. 2

| Name | QR | opcode | AA | TC | RD | RA | null | rcode |
|---|---|---|---|---|---|---|---|---|
| Bit qty | 1 | 4 | 1 | 1 | 1 | 1 | 3 | 4 |

METHOD FOR PROCESSING PACKETS USING ALG DNS

FIELD OF TECHNOLOGY

The present technology relates to telecommunications, and particularly to controlling DNS sessions for NAT using ALG DNS.

BACKGROUND

There is a conventional CG NAT technology that translates private IPv4 addresses into public ("white") ones, taken from a certain pool of public IPv4 addresses. This technology may be implemented through software or hardware means, or both.

When a packet passes from the provider's internal network into an external one, such as the Internet, the NAT translator starts a user session. At the same time, an entry is created in the user session table, that contains the IP address and port in the internal network (internal address and port) and matching external IP address and port, into which the internal address and port have been translated. Then, the packet is sent to the Internet with its source IP address and port translated into external ones.

When a reply is received from the Internet, then a NAT translator looks up the corresponding user session, translates the external destination IP address and port into the internal ones, then sends the reply to the internal network.

The number of available user sessions is limited by the memory, which stores the user session table, and the speed of searching through that table. That is why it is desirable to clear unused user sessions, e.g. by removing associated entries from the table.

In case of User Datagram Protocol (UDP) packets, user sessions (translation table entries) are cleared only after the timer is up (see RFC 4787 "NAT Behavioral Requirements for Unicast UDP", 4.3). The recommended timer value is 5 mins by default (but should not be less than 2 min). Yet, so-called well-known ports (UDP 0-1023) may have a shorter timeout. Shorter timers for certain ports are considered to be an optimization method.

An Application Level Gateway (ALG) for the CG NAT translator is a component that processes packets of a certain network protocol, which pass through ALG.

When the ALG for DNS is not used, user sessions created for DNS sessions are cleared only when associated timers are up and there are no new UDP packets. Usually, the timer value is at least 2 min (5 min recommended).

At the same time, DNS sessions occupy space in the user session table thus limiting the number of available user sessions. Therefore, the user session resources are not used efficiently.

SUMMARY

In order to overcome the drawbacks of the conventional solutions, the non-limiting embodiments of the present technology provide a method of processing data packets, the method executable by a router, the router including a CPU, a RAM, and a network interface controller.

In accordance with at least one non-limiting embodiment, the method comprises receiving, by the router, an indication of a UDP port number associated with a port used by a DNS server and a session duration for the port; receiving, by the router via the network interface controller, at least one UDP packet; in response to a destination port of the at least one UDP packet matching the DNS port number, sending by a NAT component of the router, the at least one UDP packet to an ALG DNS handler of the router; analyzing, by the ALG DNS handler a payload length of the at least one UDP packet.

In accordance with at least one non-limiting embodiment, the method further comprises in response to the at least one UDP packet meeting a processing condition, the processing condition being at least one of: the payload length being shorter than a first pre-determined threshold and the payload length being longer than a second pre-determined threshold: stopping by the ALG DNS handler processing the at least one UDP packet and transmitting the at least one UDP packet to the NAT component of the router for sending the at least one UDP packet to a receiver thereof.

In accordance with at least one non-limiting embodiment, the method further comprises in response to the at least one UDP packet not meeting the processing condition, processing by the ALG DNS handler the payload of the UDP packet as a DNS packet;

In accordance with at least one non-limiting embodiment, the method further comprises determining, by the ALG DNS handler, a DNS packet type.

In accordance with at least one non-limiting embodiment, the method further comprises in response to the DNS packet being a query packet: extracting by the ALG DNS handler an identifier from a query packet header and storing the identifier in a current NAT component session; and in response to the DNS packet being a response packet: comparing by the ALG DNS handler the identifier of the and the value stored in the current NAT component session and, in response to determining a match, terminating the current NAT component session.

In accordance with at least one non-limiting embodiment, the method further comprises processing, by the NAT component, the UDP packet and sending the UDP packet to the receiver; and in response to a given NAT component session being open for longer than the session duration, terminating the given NAT component session.

In accordance with at least one non-limiting embodiment, the first pre-determined threshold is 16 bytes. In accordance with at least one non-limiting embodiment, the second pre-determined threshold is 512 bytes.

In accordance with at least one non-limiting embodiment, the method further comprises determining an optimum session duration of a user session.

In accordance with at least one non-limiting embodiment, the session duration of a user session is determined by the router based on data exchange quality metrics.

In accordance with at least one non-limiting embodiment, the data exchange quality metrics comprise at least one of: a Packet Loss rate; a Round-Trip Delay (RTD), a Round-Trip Time (RTT), a Round-Trip Latency (RTL); a Jitter, a Packet Delay Variation (PDV), and a ratio between the number of DNS sessions that are closed when the timer is up, and the number of DNS sessions that are closed upon receiving a reply.

In accordance with at least one non-limiting embodiment, the method further comprises using neural networks to determine the optimum session duration. In accordance with at least one non-limiting embodiment, the method further comprises using machine learning algorithms to determine the optimum session duration.

In accordance with at least one non-limiting embodiment, the method further comprises using response time statistics for DNS severs based on DNS packets being processed to determine the optimum session duration.

The objective of the technology is to increase the number of available useful NAT sessions and to save router resources.

DETAILED DESCRIPTION OF THE NON-LIMITING EMBODIMENTS

Garbage collection is a way of automatic memory management. A special process, known as "garbage collector", is used to routinely clear the memory by removing objects that an application does not need anymore.

A router, as referred to herein, is a specialized network computer containing two or more network interfaces and forwarding data packets between various net segments. A router may connect mismatching networks with different architectures. Packets are forwarded, or not, based on the network topology data and set of rules defined by the Administrator.

Network Address Translation (NAT) as referred to herein is a TCP/IP network mechanism that translates IP addresses for transit packets. NAT is also known as IP Masquerading, Network Masquerading.

A router (access server, firewall) used for implementing the non-limiting embodiments of the present technology is capable of translating addresses using the NAT method. The most popular method is SNAT, which is based on replacing the source address, when the packet passes through, and reverting the destination address back, when the reply packet returns. Source and destination port numbers may be replaced/reverted as well.

It should be expressly understood that the term "router" is not limited to any particular device. Specifically, the term "router" is not limited to electronic device operating at a Third Layer (L-3 Layer) of the Open System Interconnection (OSI) Model. As such, the term "router" as used herein is meant to encompass any network routing device, whether operating on the L-3 Layer of the OSI Model, the L-2 Layer (commonly referred to a "switch" or a "network switch" of the OSI Model or any other layer of the OSI Model for that matter. Without limiting the generality of the foregoing, the router implementing the non-limiting embodiments of the present technology can be located at customer premises, at a network location (i.e. an operator location) or any other suitable location along a communication network.

Upon receiving a packet from a device within the internal network, the router translates the source IP address and (optionally) port into external ones, replaces corresponding values in the packet and stores the information regarding that translation. When the packet is sent from the external network, the device looks for the destination IP address and port and reverts their values to the internal IP address and port, which are located in the base. Thus, the reply packet reaches a device within the internal network.

Some network protocols include the local source IP address and port into their packets and then try to refer to them. Since NAT replaces local IP address with an external one, these values cannot be longer referred to, therefore the remote destination cannot establish connection. To solve this problem, Application-Level Gateway (ALG) may be used. ALG is a component of NAT router that is capable of identifying packets of some applied protocol, and then processes and/or modifies them.

A NAT component as referred to herein is a software implementation or software means for working with NAT.

Domain Name System (DNS) as referred to herein is a computer-based distributed system for obtaining information about domains. It is mostly used to obtain IP addresses by host (computer, device) names, to obtain information about mail routing and service nodes for protocols in the domain (SRV-entries).

A DNS component as referred to herein is a software implementation or software means for working with the DNS protocol.

ALG DNS as referred to herein is an application-level gateway for the DNS protocol (DNS protocol handler in ALG implementation) providing services for DNS clients.

A DNS server as referred to herein is specialized DNS-service software and a computer to run this software. DNS server responds to DNS queries.

A DNS client as referred to herein is a specialized library (or application) for determining network addresses of network nodes by their domain names by means of generating a query and receiving a reply from the DNS server.

The distributed DNS database as referred to herein is supported by means of a DNS server hierarchy that interact using either TCP or UDP.

User Datagram Protocol (UDP) is a key element of TCP/IP, a set of network protocols for the Internet. With UDP, computer applications may send messages (also known as datagrams) to other hosts via IP networks without any preliminary messages to establish special data transfer channels.

The present disclosure describes the UDP implementation of ALG DNS. UDP allows multi-channel data transfer (with port numbers), as well as integrity checks (with checksums) of headings and significant data. Reliable data transfer has to be implemented via a user application, if necessary.

Figure 1:
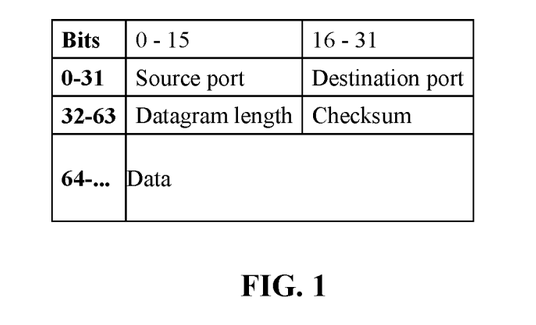
FIG. 1 depicts an example of UDP packet header format, in accordance with non-limiting embodiments of the present technology.

Referring to FIG. 1, the UDP heading has four fields, 2 bytes (16 bits) each. Two of the fields, namely Source Port and Checksum, are optional for IPv4, while the Source Port field is optional for IPv6.

The objective of the present technology is to optimize router resources when using ALG DNS.

Figure 4:
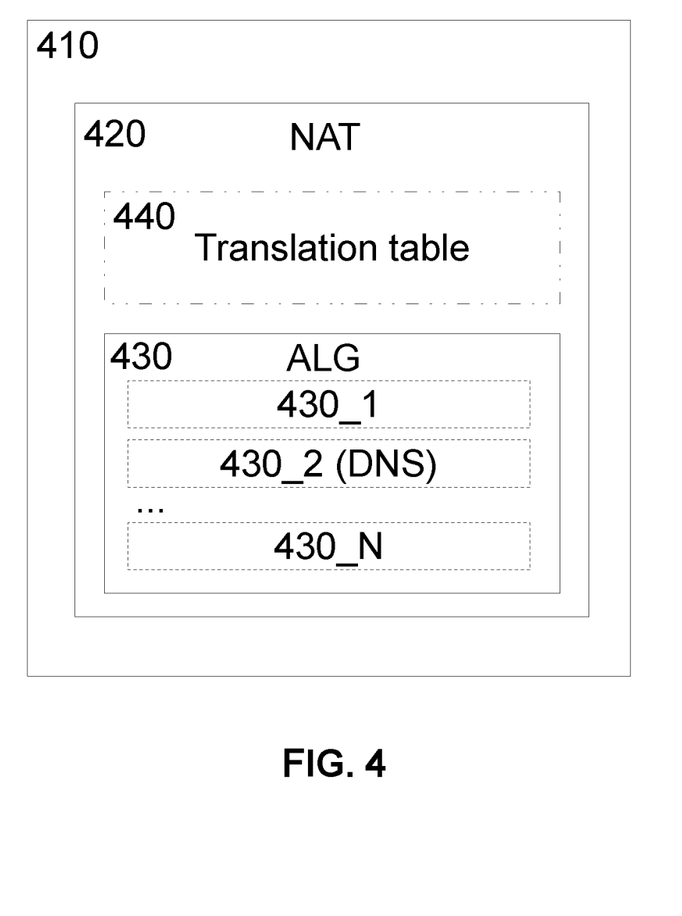
FIG. 4 depicts is an exemplary diagram of a router with NAT and ALG handlers, in accordance with non-limiting embodiments of the present technology.

Referring now to FIG. 4, which depicts a schematic diagram of a router 410, in accordance with non-limiting embodiments of the present technology. The router 410 is configured for NAT 420 and has a set of ALG handlers 430 that have been pre-installed for some applied protocols (FTP, SIP, etc.), including a DNS handler (ALG DNS). The router 410 comprises at least one processor, random access memory (RAM), read-only memory (ROM), and a LAN controller. There may be a microprogram written into the router's memory. The microprogram may control its functions and may be executed by the at least one processor.

Figure 5:
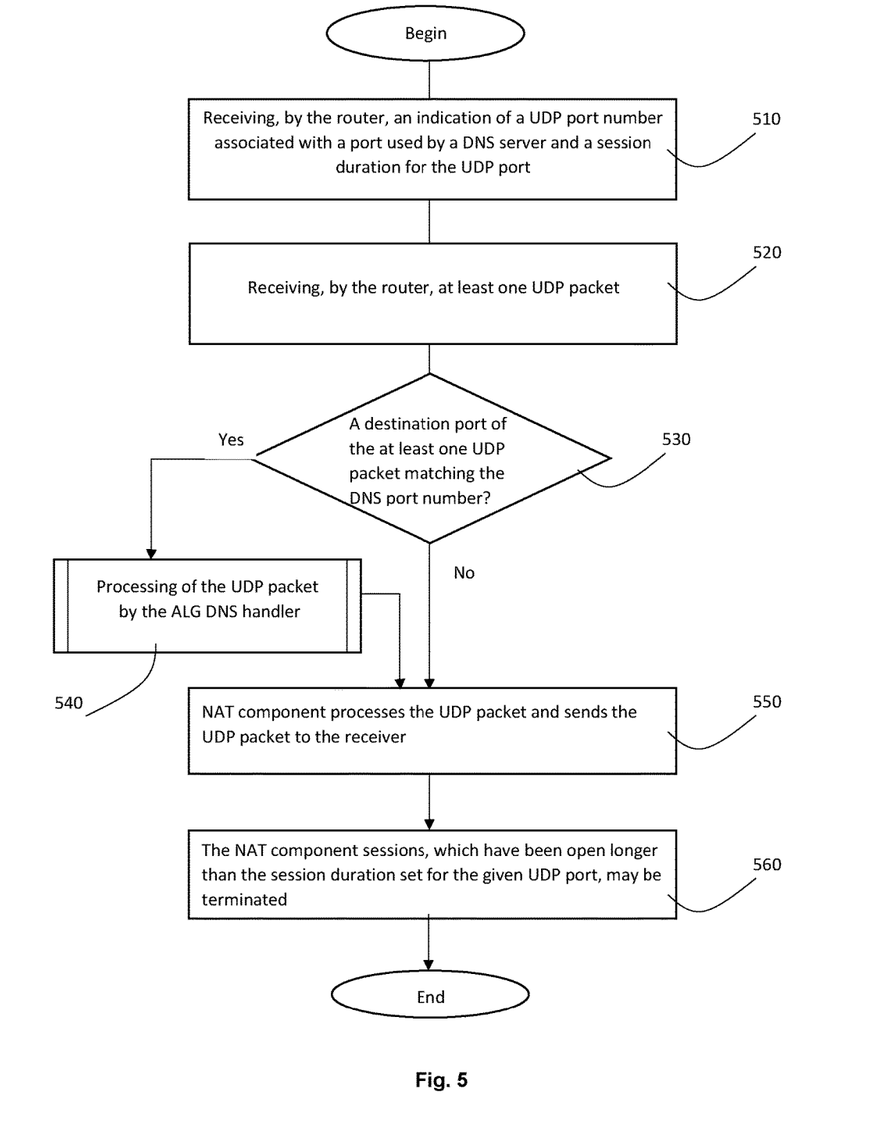
FIG. 5 depicts a block diagram of a flow chart of a method for processing packets using ALG DNS, in accordance with non-limiting embodiments of the present technology.

Referring now to FIG. 5, in accordance with at least one non-limiting embodiment of the present technology, a method for processing packets using ALG DNS is executed on the router. At step 510, the router receives an indication of a UDP port number associated with a port used by a DNS server and a session duration for that port.

In at least one non-limiting embodiment, the router is a device comprising at least a CPU, a RAM, a ROM with router's software and at least one network interface controller (NIC). The router control software is loaded by the CPU from Read-Only Memory into Random Access Memory and is executed. The software may be a firmware (e.g. DD-WRT) with a set of components for router operation.

In at least one non-limiting embodiment, the router is a computer comprising at least a CPU, a RAM, a hard drive and at least one network interface controller (NIC). The router control software may be loaded by the CPU from the hard drive into Random Access Memory and is executed. The router control software may be an operating system (e.g. Linux, Windows or Android) with a set of components for router operation. These components may include at least a NAT component, a DNS component and an ALG component that includes a DNS handler. In at least one non-limiting embodiment, the components may further comprise a component for analyzing data exchange quality metrics.

Initially, when the router 410 is set up (configured), the Administrator or a user (with a required authorization) may set the UDP port number that is to be used by the DNS component. Packets addressed to this port are then considered by the router to be DNS packets.

In at least one non-limiting embodiment, the UDP port may be set at 53, according to RFC 1035. In at least one non-limiting embodiment, the UDP port may be set on the router within the [0 . . . 65535] range.

In at least one non-limiting embodiment, the session duration (life) may be set for each UDP port. In at least one non-limiting embodiment, the session duration may be recommended to be within 2 to 5 minutes.

So-called well-known ports (UDP 0-1023) may have a shorter timeout (see RFC 4787 "NAT Behavioral Requirements for Unicast UDP", 4.3).

In at least one non-limiting embodiment, the DNS port timeout may be set to 2 mins on the router. In at least one non-limiting embodiment, the DNS port timeout may be set within the range of 2 to 5 mins on the router. In at least one non-limiting embodiment, the DNS port timeout may be set to less than 2 mins on the router.

In at least one non-limiting embodiment, session duration may be set by the router itself (for more details, see below). The settings configuration may be stored on the router (on hard drive, ROM, or any other storing device) in configuration files, a database, or RAM.

At step 520, the router receives at least one UDP packet, via the network interface controller.

Referring now back to FIG. 4, the router's NIC 410 receives a UDP packet that is first processed by the NAT component 420, and then may be sent for processing to an ALG component handler 430, if necessary.

In order to process packets and translate addresses, the NAT component may use the user session table (translation table 440, see FIG. 4) that is stored in the router's RAM. A user session may have at least the following fields: Source IP, Source Port, Destination IP, Destination Port, External IP, External Port, Protocol. Having received a packet, the NAT component may determine the values for these fields and may try to look up the corresponding entry in the user session table 440. In case there is no such entry in the table, it may be created from scratch, with the given parameters, according to the translation scheme. Such schemes may include static network address translation (Static NAT), dynamic NAT, or Overload NAT.

Then, the NAT component 420 analyzes the destination port number listed in the UDP packet. If this destination port number matches a port used by an ALG component handler, then the NAT component sends the packet to this handler. Then, the packet is processed by the ALG component 430 and its handlers 430_1, 430_2 . . . 430_N. After the ALG component has processed the UDP packet, the NAT component translates its addresses and forwards the packet to the receiver.

In at least one non-limiting embodiment, for each applied protocol that is supported by the ALG component, there is an associated handler (application-level gateway specifically for the given applied protocol), e.g. 430_1, 430_2 . . . 430_N in FIG. 4. In at least one non-limiting embodiment, ALG component handlers are called in sequence (e.g. handler 430_1 first, then 430_2, etc.), until the packet is processed by some handler, or until there are no more handlers to be called. In case no handler is capable of processing the packet, it is processed by the NAT component (FIG. 4, 420), but its payload is not interpreted (the packet is not analyzed).

If the destination port of the at least one UDP packet is the same as the DNS port, then the NAT component sends that UDP packet to the ALG DNS handler. That is, in response to a destination port number of the at least one UDP packet matching the DNS port number, a NAT component of the router sends the at least one UDP packet to an ALG DNS handler of the router.

Referring again to FIG. 5, at step 530 the NAT component checks whether the incoming UDP packet's destination port matches the port number that has been set as the DNS port during setup. If the destination port matches the DNS port, the packet is further processed by the DNS handler of the ALG component (FIG. 5, step 540). The ALG DNS handler analyzes a payload length of the at least one UDP packet. Having received the UDP packet to be processed, the ALG DNS handler (see FIG. 4, it is the second ALG handler 430_2) tries to determine whether it is a DNS packet by its payload length.

In response to the at least one UDP packet meeting a processing condition, the ALG DNS handler stops processing the at least one UDP packet and transmits the at least one UDP packet to the NAT component of the router for sending the at least one UDP packet to a receiver thereof. The processing condition may be at least one of: the payload length being shorter than a first pre-determined threshold and the payload length being longer than a second pre-determined threshold.

The ALG DNS handler 430_2 analyzes the UDP packet. During that analysis the ALG DNS handler 430_2 analyzes the payload length of the UDP packet (its data length).

In order to determine the payload length, the ALG DNS handler (430_2) may extract the value from the "datagram length" field (bits [32 . . . 47]) of the UDP packet heading and may subtract the heading length (8 bytes) from it.

In at least one non-limiting embodiment, the first predetermined threshold may be 16 bytes. In at least one non-limiting embodiment, the second pre-determined threshold may be 512 bytes.

In at least one non-limiting embodiment, if the payload length is shorter than 16 bytes or longer than 512 bytes, the ALG DNS handler (430_2) may stop processing the packet. Payload lengths shorter than 16 bytes or longer than 512 bytes may characterize broken packets or show that the packet in question is not a DNS packet. Such UDP packet is not processed by ALG DNS any further; instead, it is transmitted to the NAT component of the router, processed by the NAT component (by translating addresses) and then sent to the receiver by the router 410 using the UDP protocol (FIG. 5, step 550) by means of the NIC.

By filtering incoming UDP packets by length or port number, it is possible to save resources (processor time and RAM) that would be spent by the router 410 to process (analyze, interpret) the UDP packet payload as a DNS packet. Without such filtering, the handler may process all incoming packets that pass through the NAT component 420, which reduces the overall performance and increases the load on the computing resources of the router 410.

In at least one non-limiting embodiment, the ALG DNS handler processes the payload of the UDP packet as a DNS packet. In at least one non-limiting embodiment, in response to the at least one UDP packet not meeting the processing condition, the ALG DNS handler processes the payload of the UDP packet as a DNS packet.

Having determined that the received packet may be a DNS packet, the ALG DNS handler may process the payload of the UDP packet as a DNS packet according to RFC 1035.

In order to process (analyze, interpret) the UDP packet as a DNS packet, standard means of development environments and DNS packet libraries may be used. The DNS packet data that have been obtained as a result of processing of the UDP packet, may be stored in the router 410 RAM. Particularly, the UDP packet identifier (Identification field) may be extracted and stored in the NAT component session on the router (see below).

Figure 2:
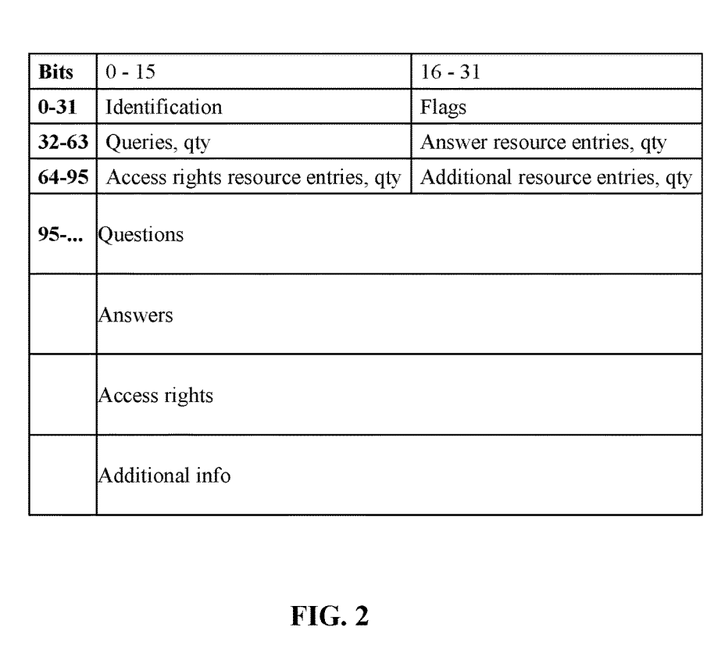
FIG. 2 depicts an example of a DNS message format, in accordance with non-limiting embodiments of the present technology.

Referring now to FIG. 2, there may be two types of DNS packets: DNS queries and DNS replies (responses). DNS queries and DNS replies (responses) may use the same format.

DNS packets may include a fixed 12-byte heading, followed by four fields of variable length.

The identifier value (Identification field) may be set by the client and returned by the server. This field may allow the client to match the reply with the query.

Figure 3:
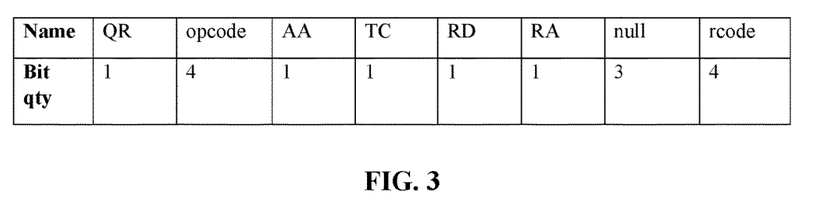
FIG. 3 depicts an example of a DNS packet header format, in accordance with non-limiting embodiments of the present technology.

Referring to FIG. 3, the 16-byte flag field may be divided into several parts.

The non-limiting embodiments of the present technology may use the following flags for DNS packets: QR (message type), a 1-bit field, where 0 is a query, 1 is a reply; and opcode (operation code), a 4-bit field, where 0 is a basic value (a standard query), and other values may be: 1 is an inverse query, 2 is a server status query.

It should be noted that even though other flag values, such as AA (authoritative reply), TC ("truncated"), RD (recursion required), RA (recursion possible), rcode (return code), are not depicted, it should not be construed that use of such other flag values is excluded. As such, the exact number or types of flag values that can be used in at least some other non-limiting embodiments of the present technology are not limited to those depicted and/or described.

Referring to step 550 at FIG. 5, if there is an error, while the UDP packet is being parsed (processed) as a DNS packet—i.e. its contents cannot be treated as a DNS packet, then ALG DNS may stop the processing, and then the NAT component may process the packet as an ordinary UDP packet.

The ALG DNS handler may then determine the DNS packet type. To determine the DNS packet type, the handler may analyze (check) the QR and opcode fields. If QR=0, the packet is a query packet; if QR=1, the packet is a reply (response) packet. If opcode=0, it is a standard query; if opcode=1, it is an inverse query, if opcode=2, it is a server status query. If QR=0, opcode=0 or opcode=1, the DNS packet is a query. If QR=1, opcode=2, the DNS packet is a reply. Depending on the packet type, it may be processed differently by ALG DNS.

If the DNS packet is a query packet, then the ALG DNS handler extracts the identifier from a query packet header and stores it in the current NAT component session.

As described above, the user session table 440 is a part of the NAT component (420) and may comprise the following fields: SourceIP, SourcePort, DestinationIP, DestinationPort, External IP, External Port, Protocol. In accordance with the non-limiting embodiments of the present technology, this table may additionally have a column (field) for query identifiers (identification bits [0 . . . 15]; see FIG. 2 from DNS packet headers. In at least one non-limiting embodiment, this additional column may be used by other ALG component handlers to store information.

In at least one non-limiting embodiment, dynamical data structures, such as hash tables, dictionaries, or lists, may be used to store query identifiers and/or other data.

After the ALG DNS handler has determined that the DNS packet is a query packet, its identifier is stored in the Identification field for the current session (that was created by the NAT component). To access the entries in the session table, the NAT component interface is used.

Then, the UDP packet is processed by the NAT component (by translating addresses) and sent to the receiver by the router 410 via the NIC.

If, for some reason, a given DNS query is left without a reply, then the user session may be closed (removed) after the timer (see above) is up.

The handler may compare the header identifier value and the value stored in the current NAT session; in case they match, the session may end. In at least one non-limiting embodiment, in response to the DNS packet being a reply packet, the ALG DNS handler compares the identifier and the value stored in the current NAT component session and, in response to determining a match, terminates the current NAT component session.

After the ALG DNS handler has determined that the DNS packet is a reply packet, its identifier (Identification field) is extracted, and the handler compares its value with the identifier value stored in the current session. If these values match, the current session may be closed (removed from the user session table, releasing the memory/RAM) after NAT finishes processing the UDP packet.

To access the entries in the user session table, the NAT component interface may be used.

In at least one non-limiting embodiment, in order to remove a user session entry (a row from the user session table), it is assigned an attribute (flag, label) that says it is to be removed. Then, the software garbage collector may detect an entry with this attribute and remove it from the router's RAM. Intervals between garbage collection operations may vary.

In at least one non-limiting embodiment, the garbage collector may be running in the background mode, being executed when net activity of the router falls down, or the router CPU load falls down. In at least one non-limiting embodiment, the garbage collector is activated unconditionally, when it is impossible to perform a memory allocation operation because of memory shortage.

In at least one non-limiting embodiment, in order to remove a user session entry, ALG DNS calls the removal procedure that automatically removes the current entry after NAT finishes processing the UDP packet.

In at least one non-limiting embodiment, in order to remove a user session entry, ALG DNS tells the NAT component that the session may be removed upon finishing processing the UDP packet, after the session has been processed, and the control has been returned to the NAT component. Upon receiving this information, the NAT component may automatically remove the entry after its processing is finished.

Figure 6:
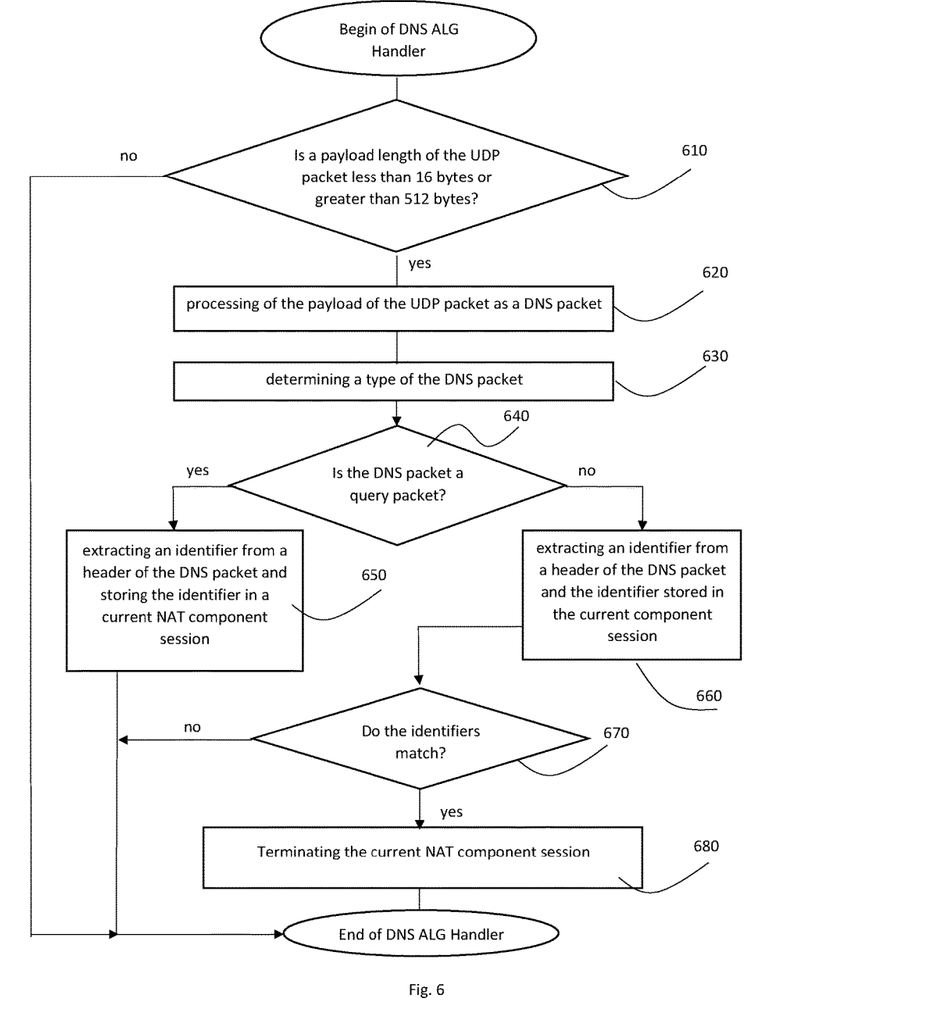
FIG. 6 depicts a block diagram of a flow chart of the method for processing packets using ALG DNS, in accordance with non-limiting embodiments of the present technology.

Referring now to FIG. 6, a block diagram of a flow chart of the method for processing packets using ALG DNS, in accordance with non-limiting embodiments of the present technology.

At step 610, the ALG DNS handler checks the payload length of the UDP packet. In case it is shorter than a first pre-determined threshold (for instance, 16 bytes) or longer than a second pre-determined threshold (for instance, 512 bytes), the handler may stop processing the packet. The packet may then proceed to NAT that processes it and sends to the receiver (step 550 at FIG. 5).

At step 620, the ALG DNS handler may process the payload of the UDP packet as a DNS packet.

At steps 630 and 640, the packet type may be determined. If the DNS packet is a query packet, then the ALG DNS handler extracts the identifier for its header and stores it in the current NAT session at step 650. Otherwise, at step 660, the handler compares the header identifier value and the value stored in the current NAT session. If they match at step 670, the session may end (step 680).

Referring again to FIG. 5, in at least one non-limiting embodiment, the NAT component processes the UDP packet and sends the UDP packet to the receiver at step 550.

The UDP packet may be processed by the NAT component (by translating addresses) and sent to the receiver by the router 410 via the NIC, using the UDP protocol. At step 560 (FIG. 5), the NAT component sessions, which have been open longer than the session duration set for the given UDP port, may be terminated.

Routinely, after the timer is up, the router may look for user sessions in RAM that have outlived their duration. In at least one non-limiting embodiment, such sessions may be closed (deleted from the table). In at least one non-limiting embodiment, such sessions may be labeled to be removed later by the garbage collector (see above) that is being executed on the router.

In at least one non-limiting embodiment, the session duration (life) of NAT component sessions for DNS ports is determined by the router based on the quality of data transfer on the network. The following data exchange quality metrics may be used to determine the quality of data transfer: a Packet Loss, a Round-Trip Delay (RTD), a Round-Trip Time (RTT), a Round-Trip Latency (RTL); a Jitter, a Packet Delay Variation (PDV), or the ratio between the number of DNS sessions that are closed when the timer is up, and the number of DNS sessions that are closed upon receiving a reply.

In at least one non-limiting embodiment, quality metrics are collected and/or updated by the router within a pre-set time interval. In at least one non-limiting embodiment, quality metrics are collected by the router for several minutes (e.g., for [1;59] mins). In at least one non-limiting embodiment, quality metrics may be collected by the router for several hours (e.g., for [1;23] hours). In at least one non-limiting embodiment, quality metrics are collected by the router for several days (e.g., for [1;31] days). In at least one non-limiting embodiment, the period of quality metrics collection/update is set by the administrator or user, during the router setup.

In at least one non-limiting embodiment, the data exchange quality metrics collection/update interval is determined automatically. In at least one non-limiting embodiment, the router automatically increases the session duration (user session life) if the data transfer quality deteriorates. In at least one non-limiting embodiment, the session duration increment (time period) is set in the router settings (e.g. 10 secs).

In at least one non-limiting embodiment, the router automatically the session duration (user session life) if the data transfer quality deteriorates. In at least one non-limiting embodiment, the session duration decrement (time period) is set in the router settings (e.g. 15 secs). In at least one non-limiting embodiment, session duration increments/decrements are determined dynamically.

In at least one non-limiting embodiment, if the ratio between the number of open DNS sessions closed by timer and the number of sessions closed by receiving a response (ratio_ops) exceeds some pre-set threshold value, it is considered that data exchange quality has deteriorated.

In at least one non-limiting embodiment, if data exchange quality has deteriorated, e.g. based on ratio_ops value, session duration is decreased.

In at least one non-limiting embodiment, if data exchange quality has deteriorated, e.g. based on ratio_ops value, session duration is increased. The rate of increase or decrease may be dynamically adjusted based on changes in the ratio described above after the session duration has been changed.

In at least one non-limiting embodiment, the router stores current session duration parameters and data exchange quality metrics, and increases that duration, either repeatedly or once. Having increased session duration, the router measures the metrics. If the metrics show that the quality has deteriorated, the router restores the previously saved state.

In at least one non-limiting embodiment, the router stores current session duration parameters and data exchange quality metrics, and decreases that duration, either repeatedly or once. Having decreased session duration, the router may measure the metrics. If the metrics show that the quality has deteriorated, the router may restore the previously saved state.

In at least one non-limiting embodiment, during the router setup, the range may be set, within which the session duration may be increased or decreased.

In at least one non-limiting embodiment, session duration may be increased or decreased within the range of [5;120] secs. In at least one non-limiting embodiment, session duration may be increased or decreased within the range of [1;5] mins.

In at least one non-limiting embodiment, the router collects the statistics of DNS port session durations (lives), which is then used as a basis for determining the session duration (life). For instance, if the majority (a higher number than a pre-set threshold value) of sessions are closed upon receiving a reply, then the duration of future user sessions may be decreased. Such statistics may be updated periodically, within a pre-set time interval.

In at least one non-limiting embodiment, an optimum session duration of a user session is determined. In at least one non-limiting embodiment, an optimum session duration of a user session is determined by means of neural networks (e.g. deep neural networks) or machine learning algorithms that allow to adapt that duration to a particular network configuration.

Figure 7A:
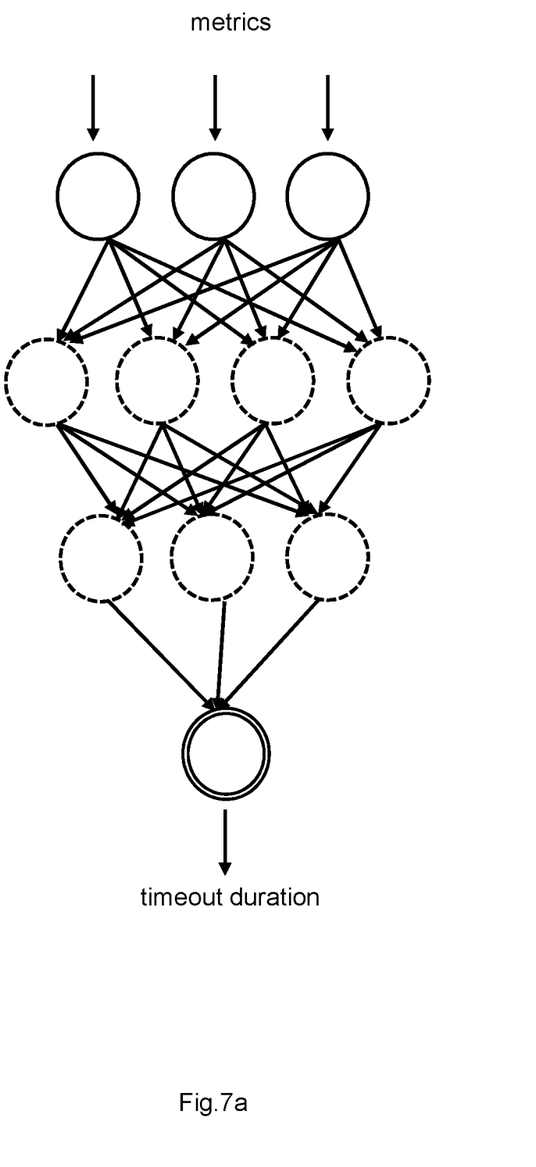
FIG. 7A schematically depicts use of the network quality metrics with machine learning algorithm, in accordance with non-limiting embodiments of the present technology.

Referring now to FIG. 7A, in at least one non-limiting embodiment, the current network quality metrics, which have been collected over a certain period of time, are provided at the input of a machine learning algorithm as a training set, with the output being the optimum session duration of a user session for the given conditions.

In at least one non-limiting embodiment, in order to generate a training set, the router modifies durations of a number of sessions and measures data exchange quality metrics within a given period of time. For instance, the router may make such measurements and modifications (both increments and decrements) each 10 mins for 2 days. Then, these data may be used to generate a training set.

In at least one non-limiting embodiment, machine learning algorithms are set up and trained by the router, after it has been installed into the network. In case the router has changed its location, or the network configuration has been altered, machine learning algorithms may have to be set up and trained again.

In at least one non-limiting embodiment, in order to determine an optimum session duration (life duration) of a user session, the router sends current quality metrics to the host server, which, based on the data provided by routers (quality metrics, network configurations, router models, etc.) generates a training set and trains machine learning algorithms and then, after training has been concluded, sends optimum session durations for user sessions to routers.

In at least one non-limiting embodiment, SVM, decision trees and Bayes classifiers are used.

In at least one non-limiting embodiment, multilayer (e.g. a multilayer perceptron) or single layer neural networks are used.

In at least one non-limiting embodiment, the input of the machine learning algorithm is a training set comprising the ratio between the number of open DNS sessions that are closed by timer, and the number of sessions closed by receiving a response (ratio_ops), and their duration lives that have been collected for a given time period. After the machine learning algorithm has been trained, it receives some ratio_ops at the input, with the output being session duration of a user session to obtain this ratio_ops.

In at least one non-limiting embodiment, the router gathers the response time statistics of DNS server response times based on DNS packets being processed. Based on such statistics, user session entries that are connected to DNS queries, it determines session duration corresponding to that DNS server response time. For instance, if responses from the DNS1 server are received within [1;15] secs range, then, in at least one non-limiting embodiment, session duration will be set equal to the maximum waiting time. In other embodiments, session duration may be set equal to average or median time. In at least one non-limiting embodiment, the statistics of response times may be gathered for some time, e.g. within the range of [1;59] mins, [1;23] hours, and then the statistics are refreshed. In at least one non-limiting embodiment, response time statistics for DNS severs based on DNS packets being processed may be used to determine an optimum session duration.

Figure 7B:
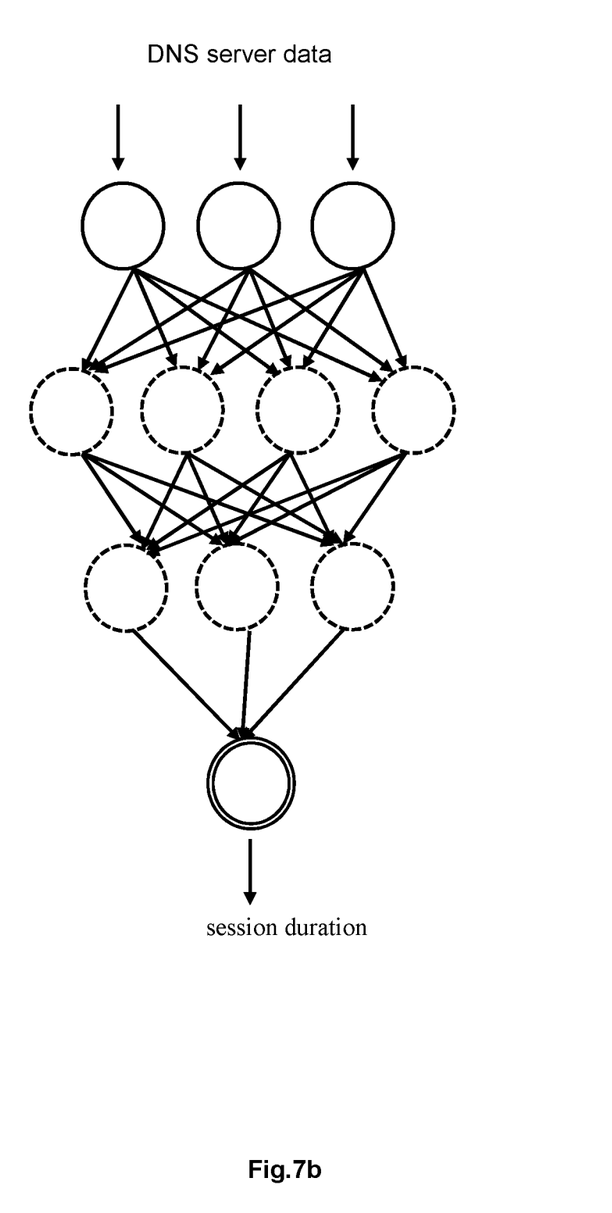
FIG. 7B schematically depicts determining of session duration using machine learning algorithms, in accordance with non-limiting embodiments of the present technology.

Referring now to FIG. 7B, in at least one non-limiting embodiment, machine learning algorithms are used instead of gathering statistics. DNS server data and response times recorded for each DNS query may be used as a training set for machine learning algorithms After the machine learning algorithm has been trained, it may receive DNS server data at the input, with the output being the optimum session duration of a user session for the given server.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described non-limiting embodiments, the elements of which are to be understood as being among other acceptable examples. All such modifications and variations are intended to be included herein within the scope of this disclosure and protected by the following claims.

What is claimed is:

1. A method of processing data packets, the method executable by a router, the router including a central processing unit (CPU), a random-access memory (RAM), and a network interface controller, the method comprising:
   receiving, by the router, an indication of a User Datagram Protocol (UDP) port number associated with a port used by a DNS server and a session duration for the port;
   receiving, by the router via the network interface controller, at least one UDP packet;
   in response to a destination port of the at least one UDP packet matching the DNS port number, sending by a network address translation (NAT) component of the router, the at least one UDP packet to an Application-Level Gateway (ALG) Domain Name System (DNS) handler of the router;
   analyzing, by the ALG DNS handler a payload length of the at least one UDP packet;
   in response to the at least one UDP packet meeting a processing condition, the processing condition being at least one of: the payload length being shorter than a first pre-determined threshold and the payload length being longer than a second pre-determined threshold:
      stopping by the ALG DNS handler processing the at least one UDP packet and transmitting the at least one UDP packet to the NAT component of the router for sending the at least one UDP packet to a receiver thereof;

in response to the at least one UDP packet not meeting the processing condition, processing by the ALG DNS handler the payload of the UDP packet as a DNS packet;

determining, by the ALG DNS handler, a DNS packet type;

in response to the DNS packet being a query packet:
   extracting by the ALG DNS handler an identifier from a query packet header and storing the identifier in a current NAT component session;

in response to the DNS packet being a reply packet:
   comparing by the ALG DNS handler the identifier and the value stored in the current NAT component session and, in response to determining a match, terminating the current NAT component session;

processing, by the NAT component, the UDP packet and sending the UDP packet to the receiver; and in response to a given NAT component session being open for longer than the session duration, terminating the given NAT component session.

2. The method of claim 1, wherein the first pre-determined threshold is 16 bytes.

3. The method of claim 1, wherein the second pre-determined threshold is 512 bytes.

4. The method of claim 1, further comprising determining an optimum session duration of a user session.

5. The method of claim 4, wherein the session duration of a user session is determined by the router based on data exchange quality metrics.

6. The method of claim 5, wherein the data exchange quality metrics comprise at least one of:
   a Packet Loss rate,
   a Round-Trip Delay (RTD),
   a Round-Trip Time (RTT),
   a Round-Trip Latency (RTL),
   a Jitter,
   a Packet Delay Variation (PDV), and
   a ratio between the number of DNS sessions that are closed when the timer is up, and the number of DNS sessions that are closed upon receiving a reply.

7. The method of claim 5, further comprising using neural networks to determine the optimum session duration.

8. The method of claim 5, further comprising using machine learning algorithms to determine the optimum session duration.

9. The method of claim 5, further comprising using response time statistics for DNS severs based on DNS packets being processed to determine the optimum session duration.

* * * * *